great patent

United States Patent [19]
Bourat et al.

[11] 3,859,253
[45] Jan. 7, 1975

[54] POLYOXETANES WITH SULPHONIC ACID GROUPS

[75] Inventors: Guy Bourat, Bourg-la-Reine; Rodolphe Margraff, Ris-Orangis, both of France

[73] Assignee: Rhone-Poulenc S.A., Paris, France

[22] Filed: July 24, 1972

[21] Appl. No.: 274,741

[30] Foreign Application Priority Data
July 26, 1971 France .............................. 71.27272

[52] U.S. Cl. .................... 260/49, 161/182, 210/38, 260/2 XA, 260/12.1 R, 260/2.2 R
[51] Int. Cl. ........................................... C08g 23/04
[58] Field of Search ...... 260/49, 2 XA, 2.1 R, 2.2 R

[56] References Cited
UNITED STATES PATENTS

| | | | |
|---|---|---|---|
| 3,663,509 | 5/1972 | Bonnard et al. ...................... | 260/49 |
| 3,709,841 | 1/1973 | Quentin .............................. | 260/2.2 R |
| 3,753,949 | 8/1973 | Weedon .............................. | 260/49 |

Primary Examiner—Lester L. Lee
Attorney, Agent, or Firm—Stevens, Davis, Miller & Mosher

[57] ABSTRACT

Polyoxetanes comprising a plurality of units of the formula:

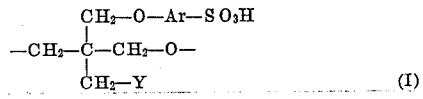

(I)

and of units of the formula:

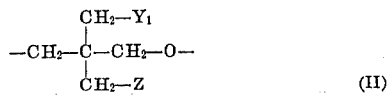

(II)

in which each of Y, $Y_1$ and Z, which may be identical or different, represents a halogen atom or an —OH, —O—, Ar' or —CN radical, —Ar' being a monovalent aromatic radical, and, optionally, of units of the formula:

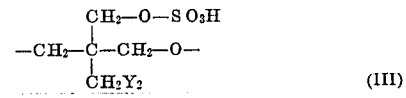

(III)

in which $Y_2$ is as defined under $Y_1$ or represents a —O—$SO_3H$ group, and/or units of the formula:

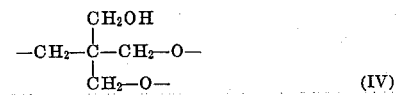

(IV)

as well as units of the formula:

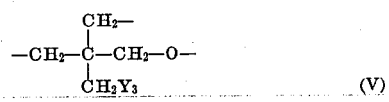

(V)

in which $Y_3$ is as defined under Y, $Y_1$, $Y_2$ or Z, and/or units of the formula:

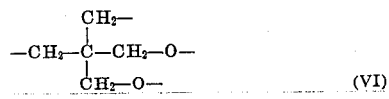

(VI)

the chain oxygen atoms of each recurring unit being attached to the chain methylene group of an adjacent recurring unit with, in addition, cross-linking via the other free valencies when the polymer contains units of formula (IV), (V) and/or (VI), are provided; these polyoxetanes are useful in the production of membranes which find utility in ion-exchange processes as well as in, for example, dialysis, osmosis and ultrafiltration.

15 Claims, No Drawings

POLYOXETANES WITH SULPHONIC ACID GROUPS

The present invention relates to polyethers containing sulphonic acid groups or sulphonate groups as well as to membranes derived from such polymers.

The polyoxetanes of this invention comprise a plurality of units of the formula:

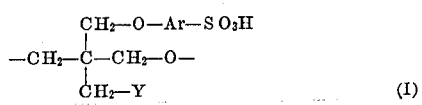
(I)

and of units of the formula:

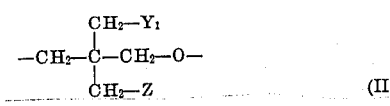
(II)

in which each of Y, $Y_1$ and Z, which may be identical or different, represents a halogen atom such as a chlorine atom, or a radical such as —OH, —O—Ar' and —CN, —Ar' being a monovalent aromatic radical, such that Y can also represent a —O—Ar—$SO_3$H radical, and —Ar— is a divalent radical such that —ArH is as defined under —Ar'.

Any individual polyoxetane can possess several different units of formula (I) and/or several different units of the formula (II), these different units being distinguished from one another by the particular nature of the Ar, Y, $Y_1$ and Z radicals.

As Ar' radicals, there may be mentioned, more particularly, the phenyl radical, the o-, m- and p-tolyl radicals, the xylyl radicals, the o-, m- and p-chlorophenyl radicals, the cumyl radical, the o-, m- and p-methoxyphenyl radicals, the o-, m- and p-acetylphenyl radicals, the 2-isopropyl-5-methylphenyl radical and the α and β-naphthyl radicals.

In addition to the units of formula (I) and (II) the polyoxetanes of this invention can also contain other units, especially units of the formula:

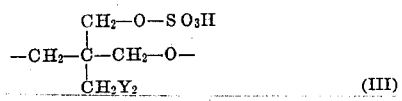
(III)

in which $Y_2$ is as defined under $Y_1$ or represents a —O—$SO_3$H group, and/or units of the formula:

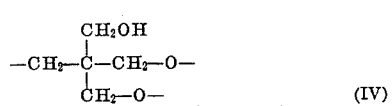
(IV)

and

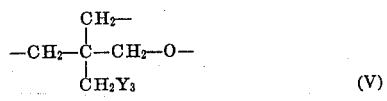
(V)

where $Y_3$ is as defined under Y, $Y_1$, $Y_2$ and Z and/or units of the formula:

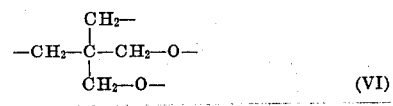
(VI)

The linking of these various recurring units occurs between the chain oxygen atom with a free valency of one of the units and the chain methylene group with a free valency of an adjacent unit. Where the polymers contain units of formulae (IV), (V) and (VI), there is in addition, cross-linking via the other free valencies.

The proportions of the different units in the polymer are in general such that the number of sulphonic acid groups, expressed in milliequivalents (meq) per gram of dry resin, is between 0.05 and 15.

The present invention also provides polymers in the form of salts derived from the polyoxetanes defined above, in particular the polymers in the form of akali metal or alkaline earth metal salts, especially sodium or potassium salts, obtained for example, by the action of the corresponding hydroxides.

The polyoxetanes of this invention are generally prepared by sulphonating a polyether containing a plurality of units of the formula:

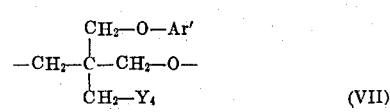
(VII)

in which: Ar' is as defined above, and $Y_4$ is as defined under $Y_1$ and Z, or represents a radical of the formula R—COO— or Ar''—COO, in which Ar'' is as defined under Ar', and R represents an alkyl or cycloalkyl radical with 1 to 12 carbon atoms, such as a methyl, ethyl, propyl, butyl or cyclohexyl radical, it being possible for these radicals optionally to be branched or substituted, for example by chlorine atoms or by hydroxyl groups, and units of the formula:

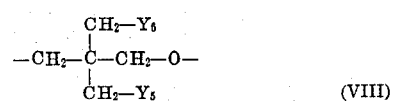
(VIII)

in which each of $Y_5$ and $Y_6$, which may be identical or different, is as defined under $Y_4$ other than a Ar'—O— radical, these units of formulae (VII) and (VIII) optionally being combined with units of formulae (IV), (V) and/or (VI).

The polyethers with units of formula (VII) are hereafter referred to as the "intermediate phenoxylated polyethers".

The sulphonation of the intermediate phenoxylated polyethers can be carried out in accordance with the usual techniques for the sulphonation of aromatic rings. In particular, sulphur trioxide, chlorosulphuric acid ($HClSO_3$) and concentrated sulphuric acid (preferably more than 80% by weight) can be used as the sulphonating agent. These sulphonating agents can be used as they are or they can be used in solution or in the form of complexes.

The solvents which can be used can be very varied in nature and may, indeed, react with the sulphonating agent: thus acetic acid, in the presence of chlorosulphuric acid, gives rise, at least partially, to acetyl sulphate. However, certain sovents/sulphonating agents combinations are incompatible; for example water and chlorosulphuric acid cannot be used together. Typical solvents which can be used include liquid SO₂, monocarboxylic acids containing from 1 to 10 carbon atoms, chlorinated aliphatic hydrocarbons such as methylene chloride, 1,2-dichloro-ethane, 1,1,2,2,-tetrachloroethane, chloroform, carbon tetrachloride and tetrachloroethylene, ethers, carbon disulphide, amines and amides, it being possible for the solvent to exert a complexing action on the sulphonating agent.

The sulphonation temperature depends on the sulphonating agent employed; in general, it is between −10° and 200°C and preferably between 15° and 100°C.

The sulphonation can also be facilitated by the use of catalysts such as silver salts.

As the sulphonation is usually carried out on an intermediate phenoxylated polyether in the solid state, the procedure generally adopted is to immerse this polyether in the sulphonating agent.

The sulphonation reaction described above can optionally be accompanied by two types of subsidiary reactions. Firstly, units of formula (III) can be produced by converting units of formula (VII) and/or (VIII), in which $Y_4$ and/or $Y_5$ and/or $Y_6$ represent a hydroxyl group, into sulphates. Secondly, units of formula (VII) and/or (VIII) in which $Y_4$ and/or $Y_5$ and/or $Y_6$ represent Ar"COO— or R—COO radicals can be saponified. The saponification of these units gives rise to units of formula (I) and/or (II) in which Y and/or $Y_1$ and/or Z represent a hydroxyl group.

The intermediate phenoxylated polyethers used for the production of the polyoxetanes according to this invention are essentially of two principal types: linear phenoxylated polyethers and cross-linked phenoxylated polyethers; the latter type of polyethers is that which gives rise to the polyoxetanes according to the invention with units of formula (IV), (V) and/or (VI).

The linear phenoxylated polyethers can be prepared advantageously from poly-bis-(halomethyl)-oxetane PBMO by substituting halogen atoms by aryloxy radicals. This substitution, hereafter referred to as "phenoxylation" can readily be carried out by reacting PBMO with an alkali metal phenate of formula Ar'—O—M, M being an alkali metal, preferably sodium or potassium, in an aprotic polar solvent, such as dimethylsulphoxide (DMSO), hexamethylphosphotriamide (HMPT), sulpholane, dimethylformamide, dimethylacetamide and tetramethylurea.

Suitable phenates which can be used include those derived from ordinary phenol, from α- and β-naphthol, from the cresols (o-, m- and p-), from guaiacol, from thymol, from the chlorophenols (o-, m- and p-), from the hydroxyacetophenones (o-, m- and p-) and from the isopropyl phenols (o-, m- and p-).

The amount of phenate to be employed in order to achieve a certain proportion of phenoxy groups in the treated PBMO can be determined easily in each case by simple experiment.

The PBMO is suitably employed at a concentration between 0.5 and 20% preferably between 1 and 10%, by weight. The temperature of the phenoxylation reaction is usually between 50° and 230°C, preferably between 100° and 200°C. Of course, if a solvent is used which is unstable or volatile at high temperatures, the reaction should then be carried out at a temperature lower than the decomposition temperature or under a pressure which is sufficient to maintain the solvent in the liquid state.

The linear phenoxylated polyethers prepared in this way can be modified further such that the remaining halogen atoms are replaced by radicals of formula $Y_7$ which is as defined under $Y_1$. The reaction conditions for such a substitution of the linear phenoxylated polyethers by radicals of formula $Y_7$ are similar to those discussed above for the phenoxylation, the phenate being replaced by a compound of formula $MY_7$, in which M and $Y_7$ are as defined above.

According to another method for preparing the linear phenoxylated polyethers, the order of carrying out the phenoxylation reactions and the reaction introducing $Y_7$ radicals is reversed, with reaction conditions remaining the same.

Cross-linked phenoxylated polyethers can be prepared advantageously from linear phenoxylated polyethers which also possess units of the formula:

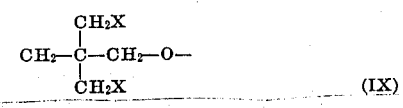

(IX)

in which X represents a halogen atom, preferably chlorine. The conversion of such linear phenoxylated polyethers to cross-linked phenoxylated polyethers can be carried out by a series of reactions which may be described as acyloxylation, oxetanation and cross-linking. This series of reactions can be shown schematically as follows:

ACYLOXYLATION

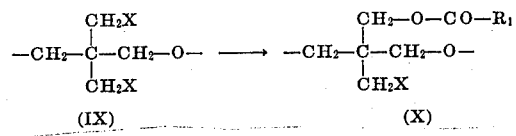

(IX)           (X)

in which $R_1$ is as defined under R. During the acyloxylation, it is also possible for diacyloxylated units of the formula:

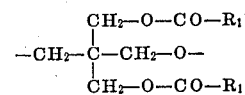

to be formed.

OXETANATION

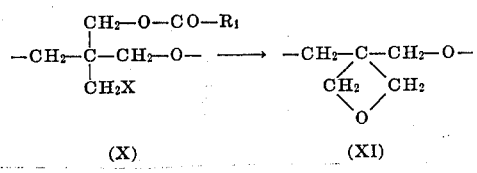

(X)           (XI)

CROSS-LINKING

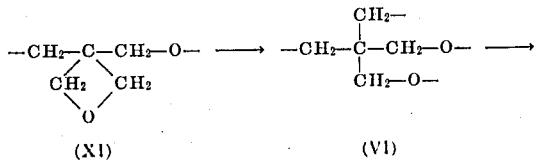

(XI)           (VI)

or

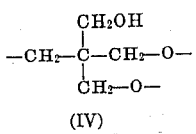

(IV)

In practice, the acyloxylation can be carried out as indicated above for the phenoxylation, the phenate being, replaced by an alkali metal salt of a weak acid of the formula $R_1COOM$, $R_1$ and M being as defined above, especially sodium and potassium acetate, propionate, butyrates and cyclohexanoate.

The oxetanation can be carried out advantageously by reacting the acyloxylated polymer, dissolved in a protic solvent medium, with a basic compound, at a temperature from 50° to 200°C, preferably between 80° and 150°C. The protic polar solvent media which can be used are media which are simultaneously protic (that is to say, they contain mobile hydrogen atoms) and which are solvents for the polymer resulting from the acyloxylation reaction. In general, mixtures of a solvent for the polymer and of a protic solvent which is miscible with the above solvent are used. Suitable solvents for the polymer include cyclic ethers such as tetrahydrofurane (THF), or dioxane, and hexamethylphosphotriamide (HMPT). Typical protic solvents which can be used include water and aliphatic alcohols with 1 to 4 carbon atoms.

The polymer resulting from the acyloxylation reaction (used in the oxetanation) is usually employed at concentrations of between 0.5 and 20%, preferably between 1 and 10% by weight.

The basic compounds which can be used in the oxetanation reaction include alkali metal hydroxides, especially potassium hydroxide and sodium hydroxide, and alkali metal alcoholates, especially potassium and sodium methylates and ethylates. Generally between 1 and 10 times, preferably between 3 and 7 times, the stoichiometric requirement of this basic compound should be used [by "stoichiometric requirement" is meant the amount of basic compound equal to twice the number of units of the formula (X)].

The cross-linking of the polymers resulting from the oxetanation gives rise to polymers termed "cross-linked phenoxylated polyethers". This cross-linking can be carried out on the polymer resulting from the oxetanation, by the action of an initiator known to polymerise 1,3-epoxides, for example Lewis acids such as boron trifluoride, phosphorus pentafluoride and their addition complexes such as their etherates. The cross-linking can be carried out on the polymer in the most varied physical forms, for example in the form of a powder, granules, films and filaments.

If a Lewis acid or a compound which is capable of giving rise to a Lewis acid under the reaction conditions is used as the cross-linking initiator, the reaction temperature is generally between −40° and +200°C, and preferably between 0° and 100°C; the initiator can be used in the form of a gas, a liquid or a solution, or it can be incorporated in the polymer to be cross-linked in the solid state by intimate mixing.

Cross-linking using radiation or Ziegler-Natta type catalysts is also possible. Various cross-linking processes which can be used in general terms for 1,3-epoxides are described in Epoxide Resins, W. G. POTTER, (1970), p.37-84.

Regardless of the process employed, the cross-linking should be carried out until the oxetane groups in the polymer have completely disappeared.

The polyoxetanes of this invention are particularly useful for the production of ion exchange membranes which can be used especially in electrodialysis or as a separator in electrochemical cells, fuel cells and electrical accumulators. These ion exchange membranes form a further subject of the invention; they have good mechanical and electrochemical properties and a good permeation selectivity. The membranes derived from cross-linked phenoxylated polyethers have, in addition, properties which remain more constant over a period of time.

The preparation of the membranes can be carried out either by sulphonation of films of linear phenoxylated polyethers or by sulphonation of films of cross-linked phenoxylated polyethers, the cross-linking, in the latter case, itself having been carried out on a polymer resulting from oxetanation, in the form of a film; the solvent for the sulphonating agent used in this sulphonation is generally a non-solvent of the film of the intermediate phenoxylated polyether.

The membranes produced in this way can be used as they are or they can be subjected to the action of a bleaching agent such as an aqueous alkaline solution containing active chlorine, which has the effect of improving the electrochemical properties of the membranes and, in particular, of lowering their electrical resistance. The composition of the bleaching agent is not critical in the sense that, if the aqueous solution contains $OH^-$ ions and $OCl^-$ ions, some lowering of the electrical resistance of the membrane occurs.

In practice, the treatment of the membrane with the bleaching agent should be continued until a constant value for this electrical resistance is obtained; this can be determined easily by measuring samples of membranes.

The treatment of the membrane with a bleaching agent can be carried out under hot conditions; however, in general, it is preferable to carry out the treatment at ambient temperature so as to avoid possibly harming the mechanical properties of the membranes.

For the production of ion exchange membranes, the polyoxetanes according to this invention usually contain between 0.1 and 10 milliequivalents (meq), preferably between 0.2 and 5 meq/g, per gram of dry product of sulphonic acid groups.

Membranes with improved mechanical properties can be produced by incorporating a reinforcing support or screen-reinforcement. These supports are, in general, woven fabrics, non-woven fabrics, grids or nettings.

The ion exchange membranes of this invention can also be used in fields which do not make use of the phenomenon of ion exchange, such as in dialysis, osmosis and ultrafiltration.

The following Examples further illustrate the present invention.

EXAMPLE 1

15.1 g (0.16 mol) of phenol are dissolved in 81.6 cm³ of a 1.96 molar solution of potassium ethylate in ethanol, and the solution is then evaporated to dryness in vacuo and the phenate redissolved in 200 cm³ of anhydrous dimethylsulphoxide (D.M.S.O.) at 140°C.

This hot solution is then poured, all at once, into a solution of 124 g (0.8 mol) of poly-3,3-bis-(chloromethyl)-oxetane (molecular weight: 170,000) in 1,800 cm³ of anhydrous DMSO at 140°C. Heating is continued, whilst stirring, for 1 hour. The reaction mixture is poured into 6 litres of water. The mixture is salted out with sodium chloride and the product washed three times with 3 l. of boiling water.

The product is rinsed with methanol, dried and dissolved in 2.5 litres of hot tetrahydrofurane (THF), the solution is filtered and the product reprecipitated in water. After drying at 80°C, 108; g of linear phenoxylated polyether are obtained, containing 38.3% (by weight) of chlorine, which corresponds to a degree of phenoxylation (percentage of chlorine atoms replaced by phenoxy groups) of 10%.

6 g of this linear phenoxylated polymer are dissolved in 60 cm³ of hot cyclohexanone. The solution is filtered and cast onto a glass plate (dimensions: 20 cm x 20 cm). After 40 hours' drying in air at 20°C, the film detaches of its own accord. Drying is continued under the same conditions until a constant weight is achieved (6.3 g: 5% of residual solvent).

The film produced in this way is immersed for 48 hours at 20°C in a solution containing 0.5% by weight of silver sulphate in 66° Baume sulphuric acid ($d = 1.83$); after this sulphonation, the film is successively immersed in sulphuric acid baths of decreasing concentrations (16 N, 8 N, 4 N and N); it is then washed with water, treated for 2 hours in normal potassium hydroxide solution at 20°C, and washed once again with hot distilled waters until the wash waters are neutral.

The membrane produced in this way has a substitution resistance of 3.6 ohm. cm², a permeation selectively of 80% and a sulphur content of 3.9% by weight.

EXAMPLE 2

The membrane of Example 1 is treated for 200 minutes in normal potassium hydroxide solution at 90°C, and then washed with hot distilled water until the wash waters are neutral.

Its substitution resistance is 3.5 ohm. cm² and its permeation selectivity is 96%.

EXAMPLE 3

The procedure of Example 1 is carried out again but sulphonating for 8 hours (instead of 48) and then carrying out the treatment described in Example 2; a membrane is obtained which has a substitution resistance of 4.6 ohm. cm², a permeation selectivity of 90% and a sulphur content of 1.45% by weight.

EXAMPLE 4

The membrane of Example 3 is bleached by immersion for 15 hours at 20°C in an aqueous solution containing 2.14 mol of sodium hypochlorite/litre. Its substitution resistance increases to 4.9 ohm. cm² and its permeation selectivity to 92%.

EXAMPLE 5

The procedure of Example 1 is repeated but sulphonating for 100 minutes at 70°C (instead of 48 hours at 20°C) and then carrying out the treatment described in Example 2. A membrane is obtained which has a substitution resistance of 4.7 ohm. cm², a permeation selectivity of 90% and a sulphur content of 2.9% by weight.

EXAMPLE 6

The procedure of Example 1 is repeated but sulphonating for 2 hours at 70°C (instead of 48 hours at 20°C) and then carrying out the treatment described in Example 2. A membrane is obtained which has a substitution resistance of 4 ohm. cm², a permeation selectivity of 89% and a sulphur content of 3.1% by weight.

EXAMPLE 7

A linear phenoxylated polyether is prepared as in Example 1, but the 15.1 g of phenol are replaced by 19.85 g (0.16 mol) of guaiacol (ortho-methoxyphenol); 135 g of linear phenoxylated polyether containing 37% by weight of chlorine are produced in this way, which corresponds to a degree of phenoxylation of 10%.

1.5 g of this linear phenoxylated polyether are dissolved in 10 cm³ of cyclohexanone at 120°C. The solution is filtered and cast on a glass plate (dimensions: 10 cm × 10 cm) and dried for 48 hours at 20°C. The film produced in this way is detached from the glass plate and sulphonated for 24 hours at 20°C, the other sulphonation conditions being similar to those of Example 1. After having carried out the treatment described in Example 2, a membrane is obtained which has a substitution resistance of 6.2 ohm. cm², a permeation selectivity of 92% and a sulphur content of 2.2% by weight.

EXAMPLE 8

A linear phenoxylated polyether is prepared as in Example 1.

16.65 g of this polyether are dissolved in 270 cm³ of hexamethylphosphotriamide (HMPT) at 180°C; 4.98 g of dry potassium acetate are added, and the temperature is maintained for 3 hours, whilst stirring, in an atmosphere of dry nitrogen. The phenoxylated and acetoxylated polyether is isolated using the technique used in Example 1 for the linear phenoxylated polyether; it is 25% acetoxylated; it then has approximately the following average formula:

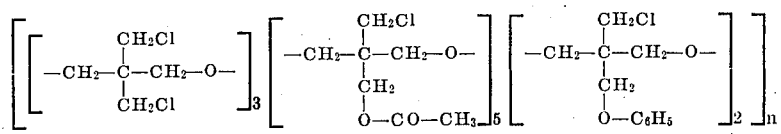

$n$ being an integer such that the number of recurring units is substantially equal to the number of units present in the starting poly-bis-(chloromethyl)-oxetane. [It is, of course, to be understood that the figures for the recurring units represent ratios only i.e. 3 of the first unit are not necessarily connected to 5 of the second unit and 2 of the third unit.]

6 g of this polymer are dissolved in 100 cm³ of boiling dioxane. 100 cm³ of a normal solution of potassium hydroxide in ethanol are added gradually over a period of 1 hour, and the solution is kept at the boil for a further hour. The solvents are evaporated in vacuo; the oxetanated polymer is washed with water to remove the soluble salts and re-dissolved in hot tetrahydrofurane; the solution is filtered, the polymer is reprecipitated in water and then dried for 24 hours at about 75°C; it then has approximately the following average formula:

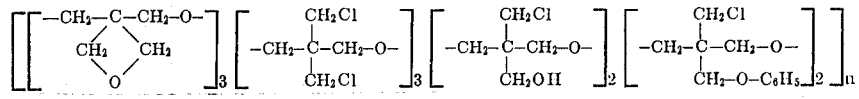

$n$ being as defined above.

1.5 g of this oxetanated polymer are cast on a glass plate (dimensions: 10 cm × 10 cm) and then dried for 48 hours at ambient temperature. The assembly of membrane and glass support is immersed for 24 hours, at about 20°C, in a solution containing 2% by weight of boron trifluoride etherate in a mixture of equal volumes of ethyl ether and petroleum ether. The film obtained is detached from the glass plate and sulphonated for 24 hours at 20°C, the other sulphonation conditions being similar to those of Example 1. It is then treated with potassium hydroxide as in Example 2. The membrane produced in this way has a substitution resistance of 1.2 ohm. cm², a permeation selectivity of 95% and a sulphur content of 6.65% by weight.

We claim:

1. Polyoxetanes which consist essentially of a plurality of units of the formula:

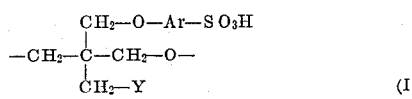 (I)

and of units of the formula:

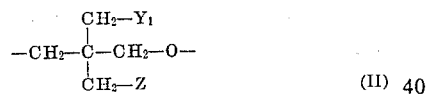 (II)

in which each of Y, $Y_1$ and Z, which may be identical or different, represents a halogen atom or an —OH, —O—Ar' or —CN radical, —Ar' being a monovalent aromatic radical, such that Y can also represent an —Ar—SO₃H radical, and Ar represents a divalent aromatic radical, the chain oxygen atom of each recurring unit being attached to the chain methylene group of the adjacent recurring unit.

2. Polyoxetanes according to claim 1 in which Ar' represents a phenyl, o, m- or p-tolyl, xylyl, o-, m- or p-chlorophenyl, cumyl, o-, m- or p-methoxyphenyl, o-, m- or p-acetylphenyl, 2-isopropyl-5-methyl-phenyl or α- or β-naphthyl radical.

3. Polyoxetanes according to claim 1 which are in the form of sulphonic acid alkali metal or alkaline earth metal salts.

4. Polyoxetanes according to claim 3 which are in the form of potassium or sodium salts.

5. Polyoxetanes according to claim 1 in which the number of sulphonic acid groups in the polymer, expressed in milliequivalents per gram of polyoxetane is between 0.05 and 15.

6. Process for the preparation of a polyoxetane as defined in claim 1 which comprises sulphonating, at a temperature from —10° to +200°C., a polyether consisting essentially of a plurality of units of the formulae:

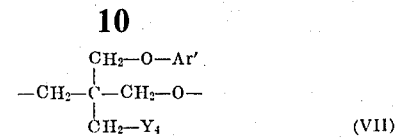 (VII)

and

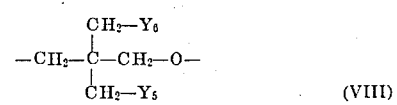 (VIII)

in which Ar' is as defined in claim 1, $Y_4$ is as defined under $Y_1$ and Z in claim 1 or represents a radical of the formula R—COO— or Ar''—COO—, in which Ar'' is as defined under Ar' and R represents an alkyl or cycloalkyl radical or a chloro- or hydroxy-alkyl or cycloalkyl radical, and each of $Y_5$ and $Y_6$ which may be identical or different, is as defined under $Y_4$ except that they cannot represent a radical of the formula Ar'—O—, the chain oxygen atom of each recurring unit being attached to the chain methylene group of the adjacent recurring unit.

7. Polyoxetanes which consist essentially of a plurality of units of the formula:

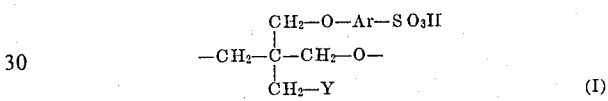 (I)

, of units of the formula:

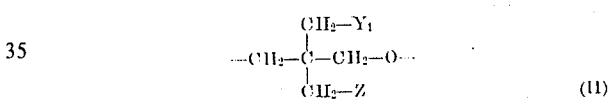 (II)

in which each of Y, $Y_1$ and Z, which may be identical or different, represents a halogen atom or an —OH, —O—Ar' or —CN radical, —Ar' being a monovalent aromatic radical, such that Y can also represent an —Ar—SO₃H radical, and Ar represents a divalent aromatic radical, and either:

i. units of the formula:

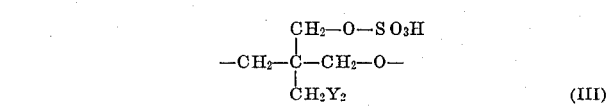 (III)

in which $Y_2$ is as defined under $Y_1$ or represents a —O—SO₃H group;

or (ii) units of the formula:

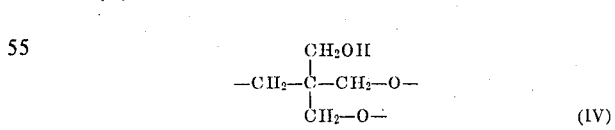 (IV)

, units of the formula:

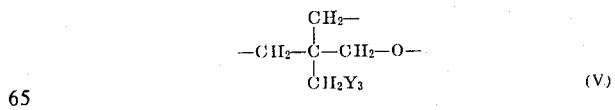 (V)

in which $Y_3$ is as defined under $Y_2$ or under Y, and units of the formula:

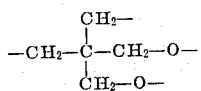 (VI)

or (iii) units of formula (III) and units of the formulae (IV), (V) and (VI), the chain oxygen atoms of each recurring unit being attached to the chain methylene group of an adjacent recurring unit, the free valencies of the units of formulae (IV), (V) and (VI) causing cross-linking.

8. Process according to claim 6 in which the polyether starting material is prepared by reacting an alkali metal phenate with a poly-bis-(halomethyl)-oxetane in an aprotic polar solvent.

9. Process according to claim 8 in which, before or after the phenoxylation, the polyether is modified by replacing some of the halogen atoms by reacting them with an alkaline derivative of formula $MY_7$ in which M represents an alkali metal and $Y_7$ represents a halogen atom or an $-OH$, $-O-Ar'$ or $-CN$ radical, $-Ar'$ being a monovalent aromatic radical.

10. Process according to claim 7 in which the polyether starting material is successively reacted (i) with an acyloxylating reagent, (ii) with an alkaline reagent in a protic polar solvent medium, and finally (iii) with an initiator for the polymerisation of 1,3-epoxides, before being sulphonated.

11. Process for the preparation of a polyoxetane as defined in claim 7 which comprises sulphonating, at a temperature from $-10°$ to $+200°C.$, a polyether consisting essentially of a plurality of units of the formulae:

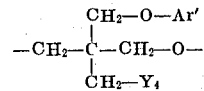 (VII)

and

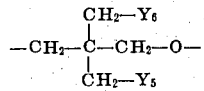 (VIII)

in which Ar' is as defined in claim 7, $Y_4$ is as defined under $Y_1$ and Z in claim 7 or represents a radical of the formula $R-COO-$ or $Ar''-COO-$, in which Ar'' is as defined under Ar' and R represents an alkyl or cycloalkyl radical or a chloro- or hydroxy-alkyl or cycloalkyl radical, and each of $Y_5$ and $Y_6$, which may be identical or different, is as defined under $Y_4$ except that they cannot represent a radical of the formula Ar'$-O-$, and also of the formulae (IV), (V) and (VI) as defined in claim 7, the chain oxygen atom of each recurring unit being attached to the chain methylene group of the adjacent recurring unit.

12. Polyoxetanes according to claim 11 in which Ar' represents a phenyl, o, m- or p-tolyl, xylyl, o-, m- or p-chlorophenyl, cumyl, o-, m- or p-methoxyphenyl, o-, m- or p-acetylphenyl, 2-isopropyl-5-methyl-phenyl or α- or β-naphthyl radical.

13. Polyoxetanes according to claim 11 which are in the form of sulphonic acid salts.

14. Polyoxetanes according to claim 13 which are in the form of potassium or sodium salts.

15. Polyoxetanes according to claim 11 in which the number of sulphonic acid groups in the polymer, expressed in milliequivalents per gram of polyoxetane, is between 0.05 and 15.

* * * * *